(12) United States Patent
Ichikawa et al.

(10) Patent No.: US 6,594,019 B1
(45) Date of Patent: Jul. 15, 2003

(54) DATA PROCESSOR AND DATA PROCESSING METHOD FOR WAVEMETER

(75) Inventors: Akio Ichikawa, Kanagawa (JP); Kenji Mogi, Osaka (JP)

(73) Assignees: Ando Electric Co., Ltd., Kanagawa (JP); Lorrant Co., Osaka (JP)

( * ) Notice: Subject to any disclaimer, the term of this patent is extended or adjusted under 35 U.S.C. 154(b) by 148 days.

(21) Appl. No.: 09/677,110

(22) Filed: Sep. 29, 2000

(30) Foreign Application Priority Data

Sep. 30, 1999 (JP) .......................................... 11-280513

(51) Int. Cl.$^7$ .............................. G01J 3/45; G01B 9/02
(52) U.S. Cl. ....................................................... 356/451
(58) Field of Search ................................. 356/341, 451

(56) References Cited

U.S. PATENT DOCUMENTS

| | | | | |
|---|---|---|---|---|
| 5,012,815 A | * | 5/1991 | Bennett, Jr. et al. | 600/512 |
| 5,627,938 A | * | 5/1997 | Johnston | 704/200.1 |
| 5,790,250 A | * | 8/1998 | Wang et al. | 356/451 |
| 5,890,098 A | * | 3/1999 | Kozaki et al. | 702/77 |

* cited by examiner

*Primary Examiner*—Robert H. Kim
*Assistant Examiner*—Richard Kim
(74) *Attorney, Agent, or Firm*—Fish & Richardson P.C.

(57) ABSTRACT

The DSP#A 5 specifies a read address for reading digital interference signal data stored in the buffer 4 to read the data, and executes the butterfly operation including a preset hamming windowing function coefficient to convert digital interference signal data to frequency data, then outputs the frequency data to the DSP#B 6.

4 Claims, 1 Drawing Sheet

DATA PROCESSOR AND DATA PROCESSING METHOD FOR WAVEMETER

BACKGROUND OF THE INVENTION

1. Field of the Invention

The present invention relates to a data processor for a wavemeter which executes data processing to display optical frequencies/wavelengths of optical signals measured by the wavemeter and to a data processing method for the wavemeter.

2. Description of the Related Art

In recent years, a sudden increase in data communication demands has requested higher-capacity optical communications. In order to meet this request, the Wavelength Division Multiplexing (WDM) transmission technology has come into service and has been upgraded actively. Higher-performance wavemeters are in need in order to evaluate transmission systems and optical devices utilizing the WDM transmission technology.

In a conventional wavemeter used for evaluating transmission systems and optical devices utilizing the WDM transmission technology, a series of processing described below used to be repeated sequentially: digital interference signal data obtained via A/D sampling of interference signals input from an interferometer is temporarily stored in a buffer; the digital interference data stored in the buffer is read by the Digital Signal Processor (DSP) to convert the data to frequency data; and the frequency data is further converted to optical frequency data or optical wavelength data.

Some of the conventional wavemeters utilize the fast Fourier transform (FFT) processing when the DSP converts digital interference data to frequency data. In the FFT processing, chronological digital interference signal data is divided by predetermined period and output as frequency data.

However, as a feature of the FFT processing, discontinuous points present in chronological digital interference data cause frequency data to be displayed in the data obtained via FFT processing. To cope with this, a conventional FFT processing includes a process in which digital interference signal data prior to FFT processing is multiplied by a hamming windowing function coefficient for correcting discontinuous points.

However, for a conventional wavemeter used to evaluate transmission systems or optical devices utilizing the conventional WDM transmission technology, digital interference signal data was multiplied by the hamming windowing function coefficient for correcting data discontinuous points in order to prevent occurrence of data discontinuous points in the FFT-processed frequency data, prior to FFT processing in which the DSP converted digital interference signal data to frequency data.

Thus, the DSP perform operation processing in which digital interference signal data is multiplied by the hamming windowing function coefficient then the FFT processing in which the resulting data is converted to frequency data. This places a considerable processing load on the DSP and prolongs the processing time, thus presenting a problem that the processing time from the A/D sampling to completion of a series of data processing is prolonged.

The processing after the DSP does not execute its own data processing until the data processing in the preceding stage is complete. This also prolonged the processing time from the A/D sampling to output of data processing results.

SUMMARY OF THE INVENTION

An object of the invention is to provide a data processor for a wavemeter and a data processing method for the wavemeter, wherein the processing in which the DSP multiplies digital interference signal data by the hamming windowing function coefficient and the butterfly operation processing in the first stage are executed in parallel in order to reduce time required for a series of data processing concerning the wavemeter.

According to an aspect of the invention, there is provided a data processor for a wavemeter which processes interference signals of the optical signals in order to display optical frequencies/wavelengths of optical signals measured by the wavemeter, characterized in that the data processor comprises:

first data conversion means for converting the interference signals to digital interference signal data (for example, A/D sampler 3 in FIG. 1) and second data conversion means for executing the fast Fourier transform processing including the hamming windowing function coefficient on digital interference signals converted by the first data conversion means to convert the digital interference signal data to frequency data (for example, DSP#A 5 in FIG. 2).

According to the aspect of the invention, in a data processor for a wavemeter which executes data processing to display optical frequencies/wavelengths of optical signals measured by the wavemeter, the first data conversion means converts the interference signals to digital interference signal data and the second data conversion means executes the fast Fourier transform processing including the hamming windowing function coefficient on digital interference signals converted by the first data conversion means to convert the digital interference signal data to frequency data.

According to another aspect of the invention, there is provided a data processing method for a wavemeter which processes interference signals of the optical signals in order to display optical frequencies/wavelengths of optical signals measured by the wavemeter, characterized in that the data processing method comprises:

a first data conversion step for converting the interference signals to digital interference signal data and a second data conversion step for executing the fast Fourier transform processing including the hamming windowing function coefficient on digital interference signals converted by the first data conversion step to convert the digital interference signal data to frequency data.

According to the another aspect of the invention, a data processing method for a wavemeter which executes data processing to display optical frequencies/wavelengths of optical signals measured by the wavemeter comprises:

a first data conversion step for converting the interference signals to digital interference signal data and a second data conversion step for executing the fast Fourier transform processing including the hamming windowing function coefficient on digital interference signals converted by the first data conversion step to convert the digital interference signal data to frequency data.

Thus, the processing in which digital interference signal data is multiplied by the hamming windowing function coefficient prior to fast Fourier transform processing can be omitted and the time required for a series of data processing concerning the wavemeter can be reduced, thus boosting the response time in displaying optical frequencies and optical wavelengths of optical signals.

In this case, according to the invention, a data processor for a wavemeter according to the first aspect of the invention, the second data conversion means may comprise storage means for storing the hamming windowing function coefficient.

According to the invention, the second data conversion means comprises storage means for storing the hamming windowing function coefficient.

In this case, according to the invention, a data processing method for a wavemeter according to the third aspect of the invention can be such that the second data conversion step stores the hamming windowing function coefficient in the storage means.

According to the invention, the second data conversion step stores the hamming windowing function coefficient in the storage means.

Thus, setting of an optimum fast Fourier transform processing depending on the characteristics of optical signals to be measured can be made with ease, thus facilitating change to specifications of the wavemeter.

DETAILED DESCRIPTION OF THE PRESENT INVENTION

Embodiments of the invention are detailed below with reference to drawings.

Figure 1:
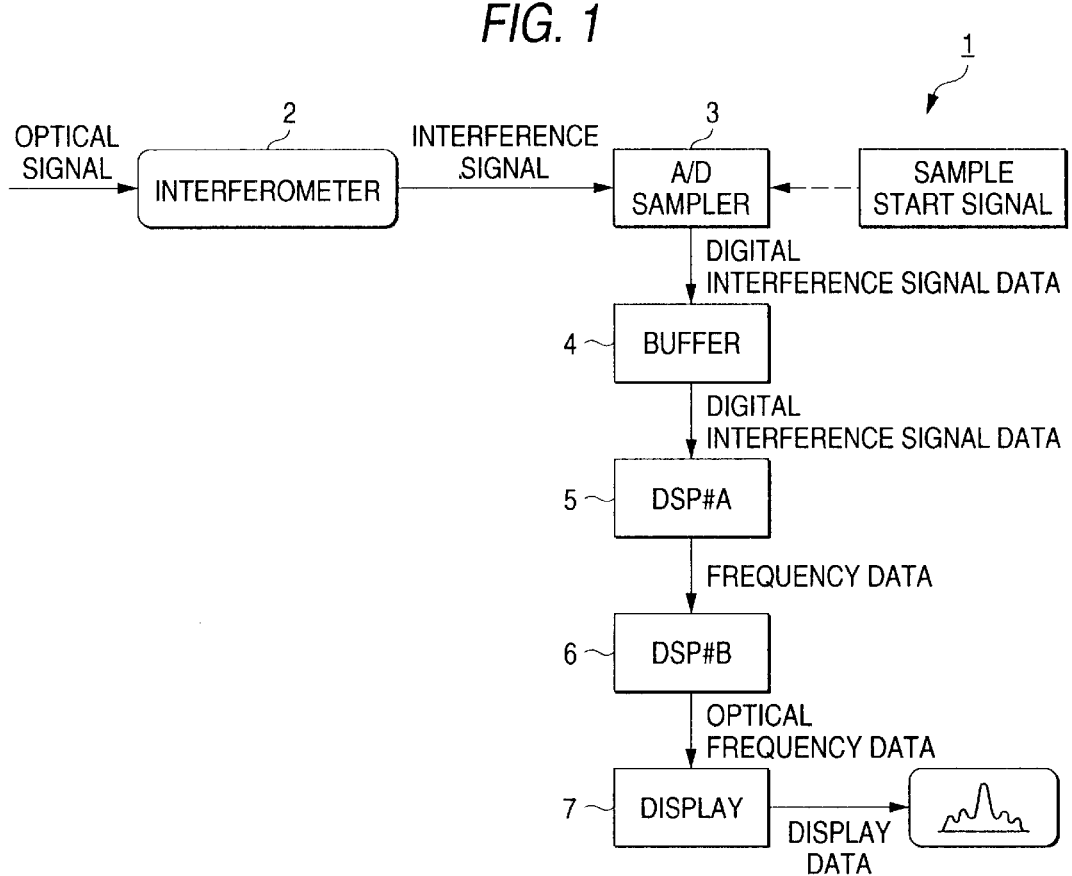
FIG. 1 is a block diagram showing the key configuration of a wavemeter 1 according to an embodiment of the invention.
Figure 2:
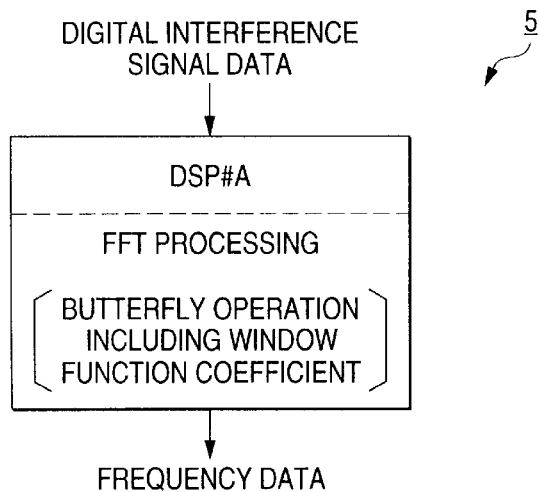
FIG. 2 is a diagram showing processing in the DSP#A 5 in FIG. 1.

FIGS. 1 and 2 show embodiments of a wavemeter according to the invention. First, the configuration of each embodiment will be discussed.

FIG. 1 is a block diagram showing the general configuration of a wavemeter 1 according to the embodiment. In FIG. 1, the wavemeter 1 is composed of an interferometer 2, an A/D sampler 3, a buffer 4, a DSP#A 5, a DSP#B 6, and a display 7.

The interferometer 2 generates interference signals from measured optical signals coming from transmission systems and optical devices using the WDM transmission technology to be measured, and inputs the resulting interference signals to the A/D sampler 3.

The A/D sampler 3, triggered by sample start signals input from the external circuit in FIG. 2, starts sampling the interference signals input from the interferometer 2, samples the interference signals at a preset sampling timing, performs A/D conversion on the sampled data by using predetermined number of quantizing bits to produce digital interference signal data, and specifies a write address in the buffer 4 for storing the digital interference signal data.

The buffer 4 has a memory area for storing digital interference signal data. In the buffer 4, digital interference signal data is stored at a specified write address, and digital interference signal data is read from read address specified by a DSP#A 5.

The DSP#A 5 specifies a read address for reading digital interference signal data stored in the buffer 4 to read the data, executes the FFT processing for converting the read digital interference signal data to frequency data, then outputs the resulting frequency data to a DSP#B 6.

The DSP#A 5 applies a preset hamming windowing function coefficient to the coefficient in the first stage of the fast Fourier transform processing and executes the butterfly operation including the hamming windowing function coefficient to convert digital interference signal data to frequency data.

The DSP#A 5 comprises a memory for storing the hamming windowing function coefficient. Setting of the hamming windowing function coefficient can be changed as necessary depending on the characteristics of the digital interference signal data to be processed.

The DSP#B 6 executes the data conversion processing in which frequency data input from the DSP#A 5 is converted to optical frequency data or optical wavelength data, and outputs the resulting optical frequency data or optical wavelength data to the display 7.

The display 7 converts optical frequency data or optical wavelength data to display data and executes the display processing for displaying optical frequencies or optical wavelengths contained in optical signals input to the interferometer 2.

Operation of the embodiment is described below.

In the wavemeter 1 of FIG. 1, the interferometer 2 generates interference signals from measured optical signals coming from transmission systems and optical devices using the WDM transmission technology to be measured, and inputs the resulting interference signals to the A/D sampler 3.

The A/D sampler 3, triggered by sample start signals input from the external circuit in FIG. 2, starts sampling the interference signals input from the interferometer 2, samples the interference signals at a preset sampling timing, performs A/D conversion on the sampled data by using predetermined number of quantizing bits to produce digital interference signal data. The A/D sampler 3 specifies a write address in the buffer 4 for storing the digital interference signal data.

The DSP#A 5 specifies a read address for reading digital interference signal data stored in the buffer 4 to read the data, and executes the butterfly operation including a preset hamming windowing function coefficient to convert digital interference signal data to frequency data as shown in FIG. 2, then outputs the frequency data to the DSP#B 6.

The DSP#,B 6 executes the data conversion processing in which frequency data input from the DSP#A 5 is converted to optical frequency data or optical wavelength data, and outputs the resulting optical frequency data or optical wavelength data to the display 7.

The display 7 converts optical frequency data or optical wavelength data to display data and executes the display processing for displaying optical frequencies contained in optical signals input to the interferometer 2.

Thus, in the wavemeter 1 according to the embodiment, the DSP#A 5 applies a preset hamming windowing function coefficient to the coefficient in the first stage of the fast Fourier Transform processing and executes the butterfly operation including the hamming windowing function coefficient to convert digital interference signal data to frequency data.

As a result, in the DSP#A 5, the processing in which digital interference signal data is multiplied by the hamming windowing function coefficient prior to FFT processing can be omitted and the time required for a series of data processing concerning the wavemeter can be reduced, thus boosting the response time in displaying optical frequencies and optical wavelengths of optical signals.

The DSP#A 5 comprises a memory for storing the hamming windowing function coefficient and setting of the hamming windowing function coefficient can be changed as necessary depending on the characteristics of the digital interference signal data to be processed. Accordingly, setting of an optimum fast Fourier transform processing depending on the characteristics of optical signals to be measured can be made with ease, thus facilitating change to specifications of the wavemeter.

Although the foregoing embodiment of the invention assumes that the DSP is composed of two stages, it is to be understood that a DSP composed of a single stage can reduce data processing time also.

According to the data processor and the data processing method for a wavemeter of the invention, the processing in which digital interference signal data is multiplied by the hamming windowing function coefficient prior to FFT processing can be omitted and the time required for a series of data processing concerning the wavemeter can be reduced, thus boosting the response time in displaying optical frequencies and optical wavelengths of optical signals.

According to the data processor and the data processing method for a wavemeter of the invention, setting of an optimum fast Fourier transform processing depending on the characteristics of optical signals to be measured can be made with ease, thus facilitating change to specifications of the wavemeter.

What is claimed is:

1. A data processor for a wavemeter processing an interference signal of optical signals to display an optical frequency/wavelength of the optical signals measured by the wavemeter, the data processor comprising:

first data conversion means for converting the interference signal to a digital interference signal data; and second data conversion means for executing fast Fourier transform processing including a window function coefficient on the digital interference signal data to convert the digital interference signal data to frequency data, wherein the second data conversion means applies the window function coefficient to a coefficient of the digital interference signal data in a first stage of the fast Fourier transform processing and executes a butterfly operation including the window function coefficient, wherein the window function and the butterfly operation are performed in parallel.

2. The data processor according to claim 1, wherein the second data conversion means comprises storage means for storing the window function coefficient.

3. A data processing method for a wavemeter processing an interference signal of optical signal to display an optical frequency/wavelength of the optical signals measured by the wavemeter, the data processing method comprising:

converting the interference signal to a digital interference signal data and executing fast Fourier transform processing including the window function coefficient on the digital interference signal data to convert the digital interference signal data to frequency data, wherein the window function coefficient is applied to a coefficient of the digital interference signal data in a first stage of the fast Fourier transform processing in parallel with execution of a butterfly operation including the window function coefficient is executed, wherein the window function and the butterfly operation are performed in parallel.

4. The data processing method according to claim 4, wherein the window function coefficient is stored in storage means.

* * * * *